US009990396B2

(12) United States Patent
Baranczyk et al.

(10) Patent No.: US 9,990,396 B2
(45) Date of Patent: Jun. 5, 2018

(54) FORECASTING QUERY ACCESS PLAN OBSOLESCENCE

(71) Applicant: International Business Machines Corporation, Armonk, NY (US)

(72) Inventors: Shawn J. Baranczyk, Rochester, MN (US); Rafal P. Konik, Oronoco, MN (US); Roger A. Mittelstadt, Byron, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 14/612,520

(22) Filed: Feb. 3, 2015

(65) Prior Publication Data

US 2016/0224688 A1 Aug. 4, 2016

(51) Int. Cl.
*G06F 17/30* (2006.01)

(52) U.S. Cl.
CPC .. *G06F 17/30463* (2013.01); *G06F 17/30129* (2013.01); *G06F 17/30979* (2013.01)

(58) Field of Classification Search
CPC ......... G06F 17/30463; G06F 17/30129; G06F 17/30979
USPC .......................................................... 707/718
See application file for complete search history.

(56) References Cited

U.S. PATENT DOCUMENTS 7,831,569 B2 11/2010 Bestgen et al.
7,991,763 B2 8/2011 Bestgen et al.
9,720,967 B2 8/2017 Lee et al.
9,727,609 B2 8/2017 Su et al.
2005/0177557 A1* 8/2005 Ziauddin ........... G06F 17/30306
2006/0031200 A1 2/2006 Santosuosso
2006/0136396 A1 6/2006 Brobst
2007/0282794 A1* 12/2007 Barsness ........... G06F 17/30445
2008/0052720 A1* 2/2008 Barsness ................... G06F 9/50 718/104
2008/0133458 A1* 6/2008 Zabback ........... G06F 17/30469
2008/0270392 A1* 10/2008 Day .................. G06F 17/30471
2008/0288446 A1 11/2008 Hu et al.
2009/0100114 A1 4/2009 Bestgen et al.
2009/0112799 A1* 4/2009 Barsness ........... G06F 17/30442
2010/0005340 A1* 1/2010 Belknap .............. G06F 11/3688 714/37
2010/0030758 A1 2/2010 Belknap et al.
(Continued)

OTHER PUBLICATIONS

IBM, "List of IBM Patents or Patent Applications Treated as Related", May 2, 2017, 2 pages.
(Continued)

*Primary Examiner* — Evan Aspinwall
(74) *Attorney, Agent, or Firm* — Nicholas D. Bowman

(57) ABSTRACT

A query is received. Based on statistics for a database, a first query access plan is generated for executing the query on the database. A first result set for the query is obtained by implementing the first query access plan on the database. Based on at least one trend in the statistics, a target time after which implementing the first query access plan will fail a set of criteria is forecasted. In response to the forecasting and based on the statistics, a replacement query access plan is generated prior to the target time. After the target time, a second result set for the query is obtained by implementing the replacement query access plan rather than the first query access plan.

14 Claims, 5 Drawing Sheets

(56) References Cited

U.S. PATENT DOCUMENTS

2010/0235349 A1* 9/2010 Kuno ................ G06F 17/30306 707/718
2010/0306188 A1* 12/2010 Cunningham .... G06F 17/30463 707/713
2011/0072008 A1 3/2011 Mandal et al.
2012/0084315 A1 4/2012 Schneider et al.
2012/0191639 A1 7/2012 Katahira et al.
2013/0151504 A1 6/2013 Konig et al.
2013/0166486 A1 6/2013 Kim
2014/0040235 A1 2/2014 Rajan et al.
2014/0214880 A1* 7/2014 Chi .................. G06F 17/30442 707/768
2016/0004621 A1 1/2016 Gongloor et al.
2016/0203404 A1* 7/2016 Cherkasova ...... G06F 17/30445 706/12
2016/0292167 A1 10/2016 Tran et al.
2016/0292223 A1 10/2016 Konik et al.
2016/0292224 A1 10/2016 Konik et al.
2016/0292225 A1 10/2016 Konik et al.
2016/0292226 A1 10/2016 Konik et al.
2016/0321101 A1* 11/2016 Langseth .............. G06F 9/4818

OTHER PUBLICATIONS

Konik et al., "Generating Multiple Query Access Plans for Multiple Computing Environments," U.S. Appl. No. 14/675,799, filed Apr. 1, 2015.

Konik, et al., "Generating Multiple Query Access Plans for Multiple Computing Environments," U.S. Appl. No. 14/675,803, filed Apr. 1, 2015.

Baranczyk et al., "Forecasting Query Access Plan Obsolescence," U.S. Appl. No. 14/675,808, filed Apr. 1, 2015.

IBM, "List of IBM Patents or Patent Applications Treated as Related."

Mell et al., "The NIST Definition of Cloud Computing," National Institute of Standards and Technology, U.S. Department of Commerce, Special Publication 800-145, Sep. 2011.

* cited by examiner 501 502 503 504 505 506 507

| Value | Value Current Estimate in Table | Value Current Change Rate (per Minute) | Switch Query Access Plan Count for Query Acces Plan 1 of Query 1 | Switch Query Access Plan Target Time (in Minutes) for Query Acces Plan 1 of Query 1 | Switch Query Access Plan Count for Query Acces Plan 2 of Query 2 | Switch Query Access Plan Target Time (in Minutes) for Query Acces Plan 2 of Query 2 |
|---|---|---|---|---|---|---|
| A | 1000 | 100 | 1500 | 5 | 3000 | 20 |
| B | 2000 | (-10) | 1500 | 50 | 1500 | 50 |
| D | 1 | 0 | 1500 | N/A | 2000 | N/A |
| Z | 10000 | 250 | 25000 | 60 | 12500 | 10 |

FORECASTING QUERY ACCESS PLAN OBSOLESCENCE

BACKGROUND

The present disclosure relates to database query processing and, more specifically, to forecasting the time after which a specific query access plan will be obsolete and to generating a replacement query access plan prior to that time.

Databases are well known systems for storing, searching, and retrieving information stored in a computer. One type of database used today is the relational database, which stores data using a set of tables that may be reorganized and accessed in a number of different ways. Relational databases are able to represent relationships between fields within separate tables, facilitating the retrieval of relevant information. Users may access information in relational databases using a relational database management system (DBMS).

Each table in a relational database may include a set of one or more columns with each column typically specifying a name and a data type. A query of a relational database may specify which columns to retrieve data from, how to join the columns together and conditions that must be satisfied for a particular data item to be included in a query result table. Current relational databases may require queries be composed in query languages. A widely used query language is Structured Query Language (SQL). However, other query languages are also used.

Once composed, a query is executed by the DBMS. Typically, the DBMS interprets the query to determine a set of steps that must be carried out to execute the query. These steps are together referred to as a query access plan (e.g., query execution plan). Statistics may be kept pertaining to data stored in a database. Such statistics provide data for building the query access plan. The DBMS may include a query optimizer (such as an SQL optimizer) which may select the query access plan that is likely to be the most efficient. When generated, a query access plan may contain the information necessary to retrieve rows for a query. This may include such details as the tables, indexes, parallelisms, join orders, and temporary tables, as well as the operations (e.g., transforms, sorting, grouping) to perform on each value in a column or row.

SUMMARY

According to embodiments of the present disclosure, aspects of the disclosure may include a method, a system, and a computer program product for generating a replacement query access plan. A query is received. Based on statistics for a database, a first query access plan is generated for executing the query on the database. A first result set for the query is obtained by implementing the first query access plan on the database. Based on at least one trend in the statistics, a target time after which implementing the first query access plan will fail a set of criteria is forecasted. In response to the forecasting and based on the statistics, a replacement query access plan is generated prior to the target time. After the target time, a second result set for the query is obtained by implementing the replacement query access plan rather than the first query access plan.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 5 illustrates an example frequent values list usable for detecting significant trends in statistics, in accordance with embodiments.

Figure 1:
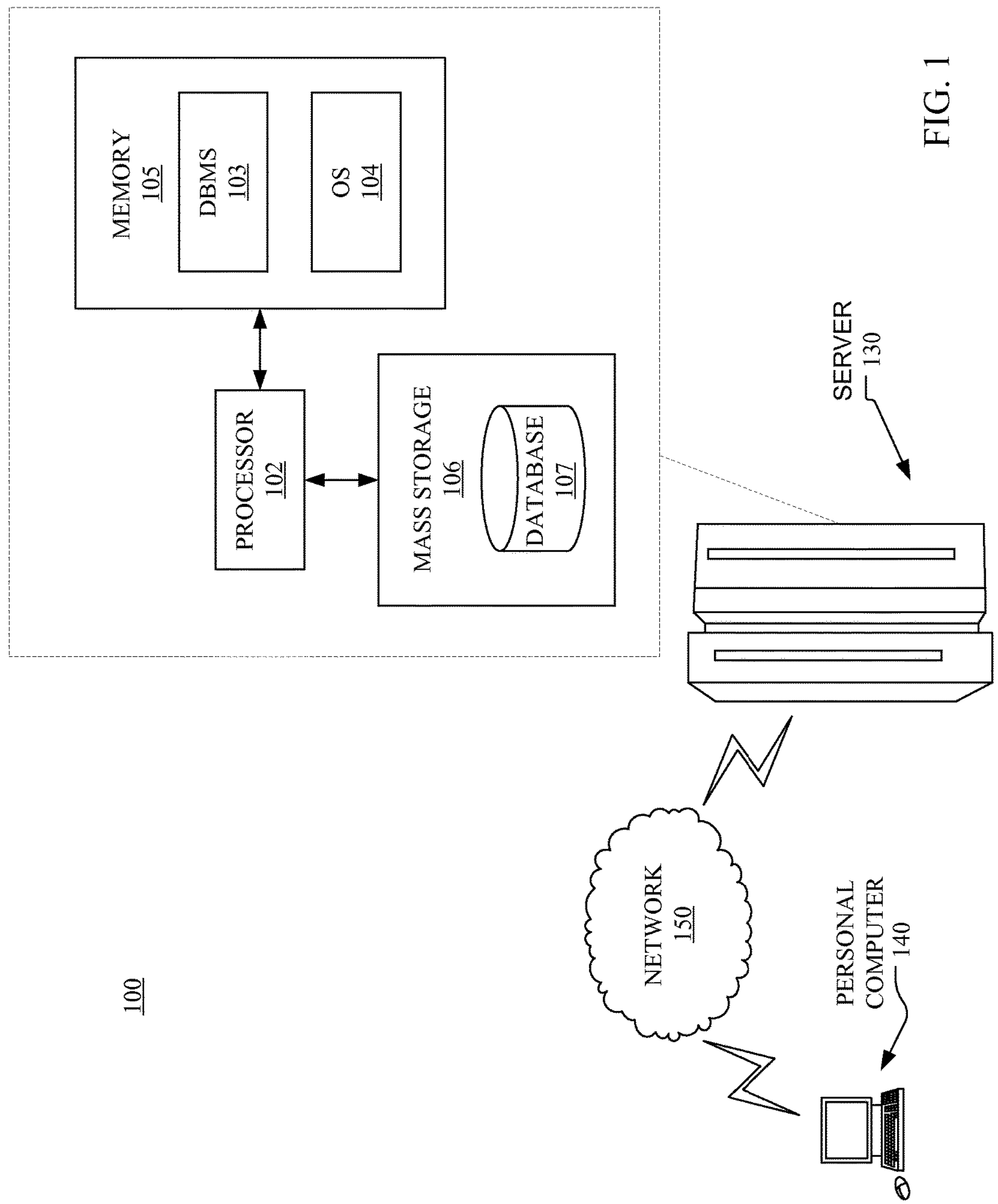
FIG. 1 illustrates a block diagram of an example distributed computing environment incorporating a database management system (DBMS), in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database query processing and, more specifically, to forecasting the time after which a specific query access plan will be obsolete and to generating a replacement query access plan prior to that time. While the present disclosure is not necessarily limited to such applications, various aspects of the disclosure may be appreciated through a discussion of various examples using this context.

For most queries there are many different ways that they can be processed. Each different way is a different query access plan that will typically have a different processing time. As a result, executing the same query on the same database may have drastically different processing times depending on the specific query access plan utilized. The goal of query optimization is to find an optimal query access plan (e.g., one with the shortest processing time for running a specific query on a specific database). While this is the goal, obtaining the best possible query access plan may be impractical and an approximation of the optimum may be discovered by comparing several different alternative query access plans.

The time required to generate a desired query access plan may also vary significantly and may depend on how much materialization and polling of statistics is required for that query access plan. Once built, a query access plan may be reused several times for the same query and may be saved for such reuse (for example, in a plan cache).

Statistics are the information used by the optimizer to evaluate query access plans. As used herein, statistics may refer to metadata about the database on which the query will be executed. In some embodiments, statistics may include data objects that contain statistical information about values (or value distributions) in one or more columns or tables in the database. These statistics may be used, for example, by the optimizer to estimate the cardinality (e.g., number of rows) that will be in a query result set. Based on this cardinality estimate, the optimizer may be able to generate a high-quality query access plan for the situation. For example, a cardinality estimate could be used to help an optimizer select a first query access plan that has an index seek operator rather than a second query access plan that has an index scan operator, because the first operator is more efficient under the circumstances.

As values or rows within a database change, whether or not a specific query access plan is optimal or cost effective may change with it. In some situations, once a specific query access plan is developed for a specific query, the database management system may continue to use that same query access plan every time the query is executed. Then, when the database changes such that the query access plan is no longer cost-effective, another replacement query access plan is generated and is used from then forward for executions of the query. This method may have some problems, however. Specifically, by waiting until a query access plan is no longer cost effective to begin generating and evaluating a replacement query access plan, certain inefficiencies and query execution delays may result. For example, consider a situation where a first query access plan is run daily. This may continue without issue for several days, then one day, immediately prior to executing the first query access plan, the optimizer determines that because of changes in the database, the first query access plan is no longer the most cost effective query access plan. At this time the database management system may be left with two unacceptable alternatives, either to implement the now suboptimal first query access plan immediately, or delay execution of the query for another more cost-effective query access plan to be generated.

In some embodiments of the present disclosure, an optimizer may use trends in statistics in order to forecast (e.g., predict, hypothesize) when a new (replacement) query access plan will be needed and to proactively generate that new query access plan before it is required.

Referring now to FIG. 1, shown is a block diagram of an example distributed computing environment 100 incorporating a database management system (DBMS) 103, in accordance with embodiments of the present disclosure. As shown, distributed computing environment 100 includes two computers, specifically, a personal computer 140 and a server 130 in communication with the personal computer 140 over a network 150. In some embodiments, the network 150 may be implemented by any number of any suitable communications media (e.g., wide area network (WAN), local area network (LAN), Internet, Intranet, etc.). Alternatively, the computers of network 150 may be local to each other, and communicate via any appropriate local communication medium (e.g., local area network (LAN), hardwire, wireless link, Intranet, etc.). In some embodiments, the network 150 may be implemented within a cloud computing environment, or using one or more cloud computing services. As described herein, a cloud computing environment may include a network-based, distributed data processing system that provides one or more cloud computing services.

As shown, the hardware and software elements of server 130 include a processor 102 in communication with mass storage 106 and memory 105. Processor 102 may include one or more processors (with each processor including one or more processor circuits) and memory 105 may incorporate any type of memory including, for example, random access memory. The memory 105 includes an operating system (OS) 104 and a database management system (DBMS) 103. The mass storage 106, which may include, for example, one or more hard disk drives, houses the database 107. In use, a user acting via the personal computer 140 may send instructions or requests (e.g., SQL queries) to the server 130 via the network 150. The requests are responded to by the database management system 103, which runs on the operating system 104. Specifically, the database management system 103 uses information obtained from the database 107 to generate responses to the requests sent from the personal computer 140.

While distributed computing environment 100 is depicted as including a personal computer 140 and a server 130, it is contemplated that, in some embodiments, computers 130 and 140 may be any relevant computer systems or combination of computer systems including, for example, servers, desktops, laptops, mobile phones, smart phones, tablets, personal or enterprise digital assistants, and the like. Further, the two computers of FIG. 1 are shown for illustrative purposes only; it is contemplated that any number of computers may be used in some embodiments.

Figure 2:
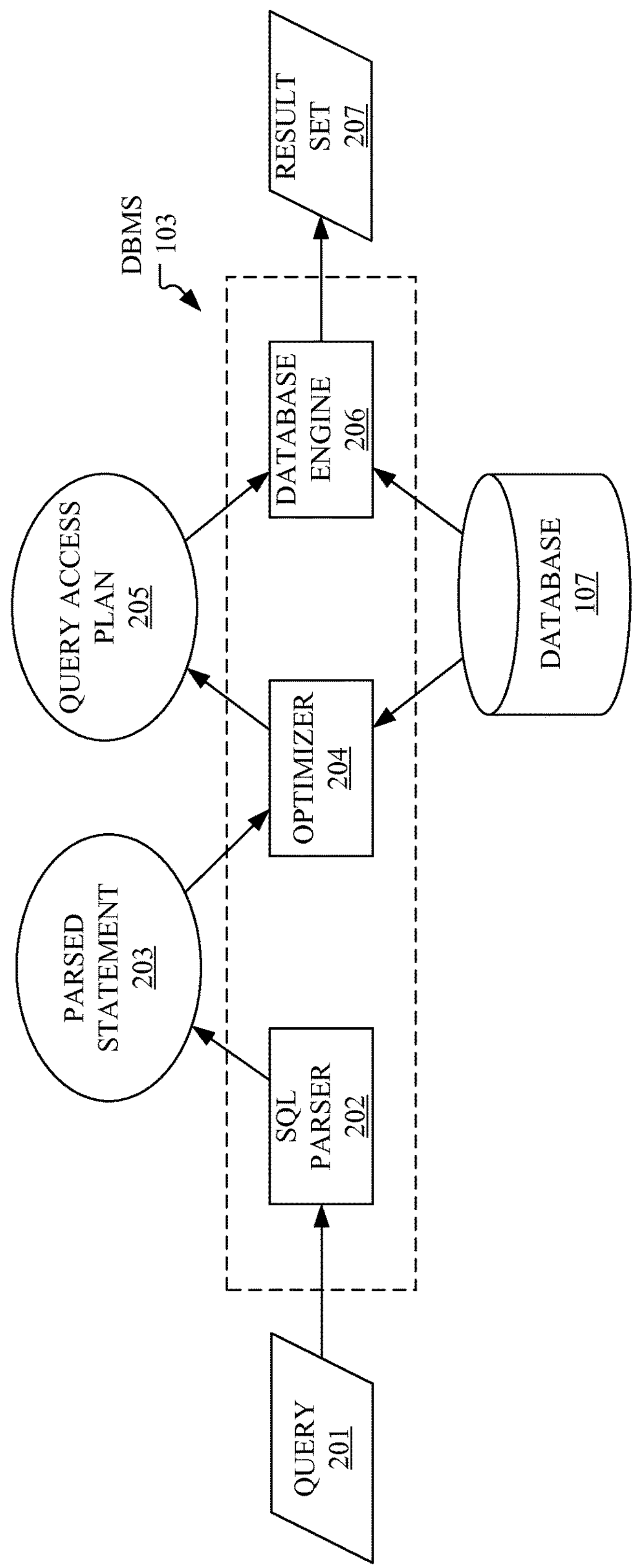
FIG. 2 illustrates a block diagram of an example use of the database management system shown in FIG. 1, in accordance with embodiments of the present disclosure.

Referring now to FIG. 2, shown is a block diagram of an example use of the database management system (DBMS) 103 shown in FIG. 1, in accordance with embodiments of the present disclosure. As shown, the database management system 103 may include a SQL parser 202, an optimizer 204, and a database engine 206. In this example, a query 201 generated by a user is received by the SQL parser 202. In some embodiments, the query 201 may be provided in the form of an SQL statement. SQL parser 202 then generates a parsed statement 203 therefrom, which is passed to optimizer 204 for query optimization. As a result of query optimization, a query access plan 205 is generated. As shown, the optimizer 204 uses statistics obtained from the database 107 in order to create the query access plan 205. Once generated, the query access plan 205 is forwarded to database engine 206 for execution of the query 201 (through implementation of the query access plan 205) on the information in database 107. The result of the execution of the query 201 is a result set 207 (e.g., an organized version of the information requested in the query), which may be transmitted to the user that submitted the query or stored for later transmission.

Figure 3:
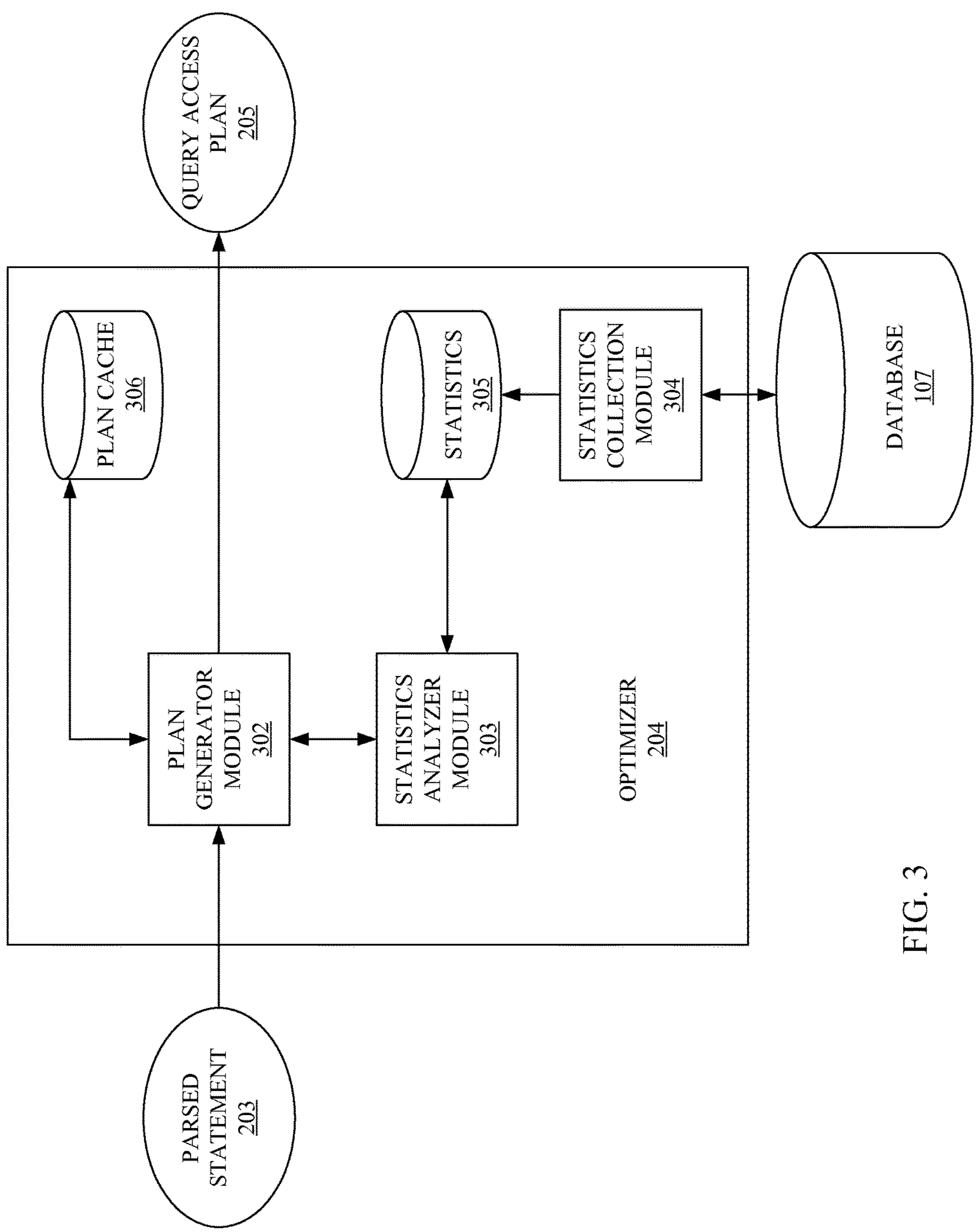
FIG. 3 illustrates a block diagram depicting a detailed view of the optimizer shown in FIG. 2, in accordance with embodiments of the present disclosure.

Referring now to FIG. 3, shown is a block diagram depicting a detailed view of the optimizer 204 shown in FIG. 2, in accordance with embodiments of the present disclosure. As shown, optimizer 204 includes three modules (a plan generator module 302, a statistics analyzer module 303, and a statistics collection module 304), as well as statistics 305 and a plan cache 306. In use, plan generator module 302 may be responsible for receiving a parsed statement 203 and outputting a query access plan 205 and/or storing a query access plan 205 to a plan cache 306. In order to obtain quality information for the plan generator module 302 to operate on, a statistics collection module 304 polls and updates statistics 305 based on the data stored in database 107. The collected statistics are then analyzed by a statistics analyzer module 303. In addition to analyzing statistics in order to provide the plan generator module 302 with the information necessary to build a query access plan 205 for the parsed statement 203, the statistics analyzer module 303 may also identify trends in the statistics that may be useful in allowing the plan generator module 302 to forecast when the query access plan 205 will be obsolete and to generate a replacement query access plan prior to that obsolescence.

Figure 4:
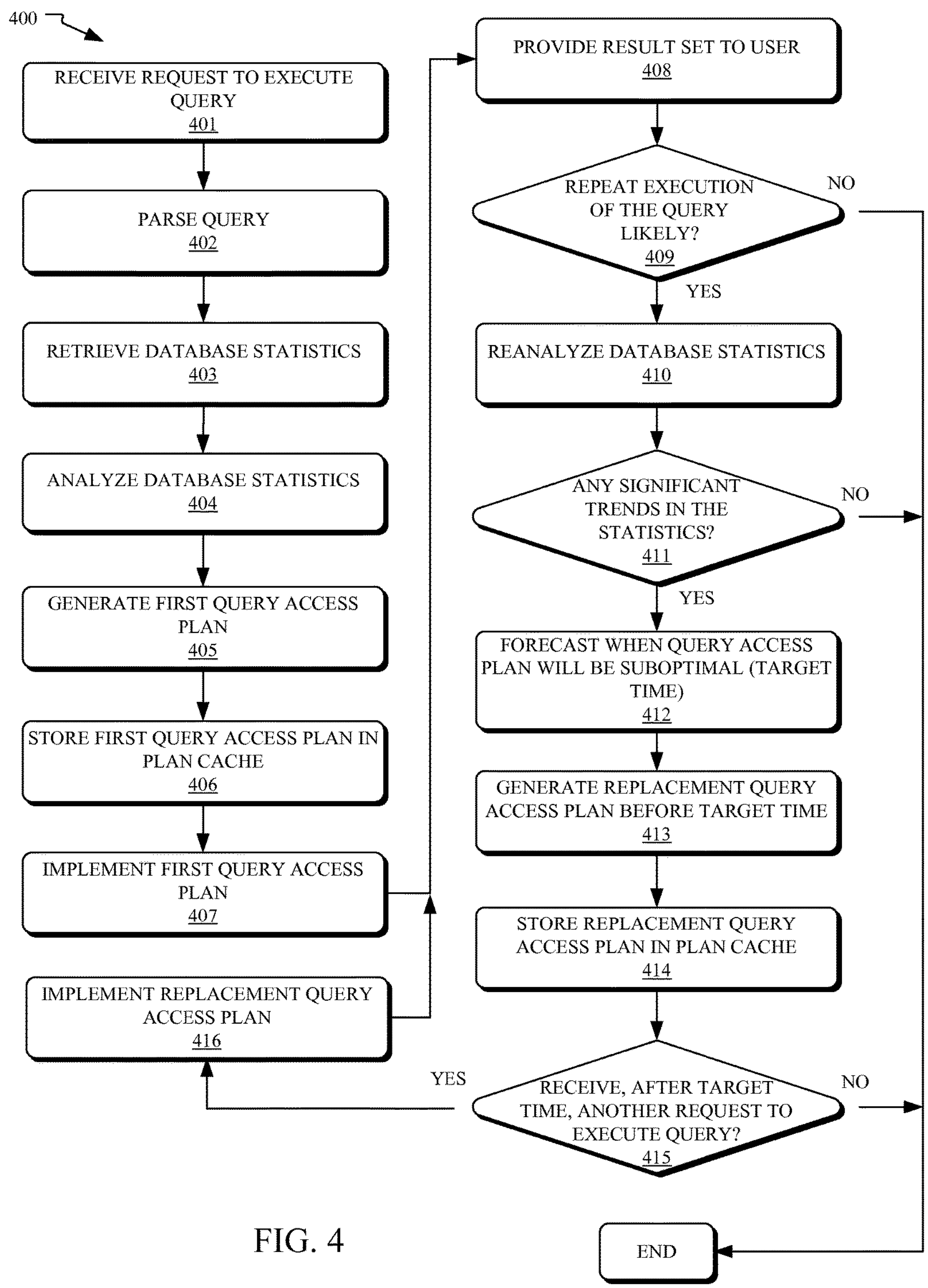
FIG. 4 illustrates a flowchart of an example method for forecasting query access plan obsolescence and proactively generating a replacement query plan, in accordance with embodiments of the present disclosure.

Referring now to FIG. 4, shown is a flowchart of an example method 400 for forecasting query access plan obsolescence and proactively generating a replacement query plan, in accordance with embodiments of the present disclosure. In some embodiments, one or more operations of method 400 may be carried out by elements of a database management system, such as SQL parser 202, optimizer 204, and database engine 206 of FIG. 2. The method 400 may begin at operation 401, wherein a request to execute a query is received. Per operation 402, the query is parsed. Per operation 403, statistics are retrieved and, per operation 404, the statistics are analyzed. Based on the analysis, per operation 405, a first query access plan is generated for the query. Per 406, the first query access plan may be stored in a plan cache until it is ready to be implemented in the database. Per operation 407, the first query access plan is implemented in the database. A result set is generated and, per operation 408, is provided to the user as a response to the query.

Next, a few threshold determinations may be made in order to aid in the ultimate determination as to whether it is worth using computing resources to proactively develop a replacement query access plan for the query. Specifically, per operation 409, a first threshold determination may be made as to whether a repeated execution of the query is likely. In making this determination, one or more factors may be taken into account including, for example, whether the query is set to be run periodically, whether the query has been run previously, and the specificity or generality of the query. If the query is not likely to be re-executed (or not likely to be re-executed often), then it may not be cost effective to build a replacement query access plan, and, accordingly, the method 400 may end. If, however, it is determined in operation 409 that repeated execution of the query is likely, then, per operation 410, the statistics may reanalyzed. The statistics may or may not be updated prior to this second analysis. In some embodiments, operation 410 may not occur on every execution of the query, even in situations where repeated execution of the query is likely. This may help to conserve resources. In addition, operation 410 may be performed as a background job, for example, when there is down time between query executions.

Based on the reanalysis of the statistics, a second threshold determination may be made, per operation 411, as to whether there are any significant trends in the statistics. Trends in the statistics may include patterns or changes in the statistics over time. For example, updating the statistics may show a consistent increase or decrease over time in the number of rows in a relevant table of the database. For another example, a trend in the statistics may cause a substantially constant (e.g., linear) rate of change over time in important items such as frequent value counts, singular value counts, unique value counts, sizes, and access times. In some embodiments, a trend may only be deemed significant if it is the type of trend that is likely to affect the obsolescence of the query access plan currently used to execute the query. For example, even if rows are being rapidly deleted from a relevant table, such trend may not be significant if the ongoing deletions are not likely to render the current query access plan as suboptimal. Further, in some embodiments, trends may only be deemed significant if they are statistically significant in terms of p-values. Further yet, in some embodiments, trends may be linear or non-linear (e.g., exponential, quadratic). If, per operation 411, it is determined that there are no significant trends in the statistics, then the currently used query access plan may be unlikely to become suboptimal in the near future, and, therefore, the method 400 may end.

If, however, it is determined in operation 411 that there is a significant trend in the statistics, then, per operation 412, this trend (or trends) in the statistics may be used to forecast a time (e.g., target time) after which the currently used query access plan will be suboptimal or will otherwise fail a set of (i.e., one or more) criteria. In some embodiments, this forecasting may rely on extrapolating the trend in the statistics, or otherwise assuming the trend will continue, in order to predict the make-up of the database at various times in the future. Based on these predicted future versions of the database (or, more particularly, predicted future statistics), determinations may be made as to when the target time will occur.

As used herein, a variety of factors may be used in formulating the set of criteria used to evaluate a current query access plan. In some embodiments, a query access plan may be deemed to fail the set of criteria when the query access plan is not the most cost effective plan. This may occur, for example, when an estimated actual cost of implementing the query access plan on the database exceeds an estimated actual cost of implementing another known query access plan (for the same query) on the database. In some embodiments, the cost of a given query access plan may refer to the amount of time that it will take to execute the query access plan on the database.

Once the determination is made that the current query access plan will fail the set of criteria at a target time, then, per operation 413, a new (replacement) query access plan may be generated based on the statistics and, potentially, based on the trend in the statistics. Depending on how the statistics change over time, a replacement query access plan may be somewhat similar to the current query access plan or may be substantially different. For example, a current query access plan could be substantially the same as its replacement query access plan except the current query access plan may include a first method of accessing a table and the replacement query access plan may include a second (different) method of accessing the same table rather than the first method. Furthermore, in such a scenario, these methods of accessing the table may be of different types from each other and may both be of certain types such as index access, table access, hash access, parallel access, and sequential access.

In order to have the replacement query access plan ready by the target time, the generation of the plan may occur prior to the target time. In some embodiments, the query access plan may be completed by some threshold time prior to the target time. This may aid in ensuring that, for requests to execute the query after the target time, there will not be a need to delay the execution long enough to build the replacement query access plan. Per operation 414, the replacement query access plan may be stored in the plan cache.

For any additional requests to execute the query prior to the target time, the original query access plan, rather than the replacement query access plan, may be used. This is because the original query access plan should still be more cost-effective to implement than the replacement plan up until the target time. In some embodiments, as the target time approaches, the statistics and the trend in the statistics may be analyzed again in order to confirm, adjust, or refine the timing of the target time. Adjustment in the target time may be necessary. For example, when the trend in the statistics become less pronounced over time, the target time may be delayed.

Per operation 415, after the target time, the replacement query access plan is implemented, per operation 416, for each request to execute the query that is received, and operations 408-416 are repeated as applicable. Once the query is no longer received, then the method 400 may end.

To aid understanding, an example scenario employing an embodiment of the present disclosure is described. In this scenario, a database includes a single table (TableA) which includes four columns (Col1, Col2, Col3, and Col4). A user decides that he wants to obtain a result set that includes all of the data in Col1 and Col2 of TableA and that he wants the output ordered by Col1. He inputs a query of "SELECT Col1, Col2 FROM TableA ORDER BY Col1" into his computer and indicates that he would like the query to run at the time he enters it. The database management system receives the query and parses it. Database statistics are then analyzed. From the statistics, the database management system ascertains that the TableA has 1,000 rows (e.g., where the statistics of importance are the ones used to determine the number of rows in the table). Based on this and other information, the optimizer determines that a first query access plan will be the most cost effective plan to execute the query and, accordingly, the first query access plan is generated and stored in the plan cache. In this instance, the first query access plan is built to perform a table scan and a simple sorting algorithm in order to generate the result set. Next, the optimizer transfers the plan to a database engine. The database engine implements the query access plan on the database. A result set is achieved and returned to the user.

After the user has received his result set, the database management system determines that, historically, the user has run the query about every ten minutes. Based on this history, the database management system determines that repeated execution of the query is likely. In response to this determination, an updated version of the statistics is reanalyzed by the optimizer. The optimizer determines based on this analysis (e.g., by comparing the updated statistics to prior versions of the statistics or to other historical information) that there is a significant trend in the statistics. Specifically, the optimizer determines that the number of rows in TableA is increasing at a rate of 100 rows per minute. The optimizer also determines that running the query will be more cost effectively executed by implementing an index plan, rather than the table scan called for in the first query access plan, as soon as the length of TableA reaches 4,200 rows. Next, by subtracting the current number of rows (1,000) from the critical number of rows (4,200) and then dividing that answer by the rate of change in the rows (100 per minute), the optimizer identifies a value of 32. From this value the optimizer forecasts that a new query access plan will be required for any execution of the query after more than 32 minutes from the present time.

Next, based on the updated statistics and the discovered trend, the optimizer begins to build a replacement query access plan that includes an index plan (rather than a table scan). Prior to the 32 minute mark, the optimizer executes the query whenever instructed by the user, using the first query access plan. By the 32 minute mark, the optimizer has built the replacement query access plan. At an execution of the query after the 32 minute mark, the replacement query access plan, rather than the first query access plan is implemented in order to obtain the newest result set for the user.

While in the above scenario, the number of rows is used for forecasting purposes, it is contemplated that, in some embodiments, any other options can be considered. These could include, for example, row size, number of bytes, cardinality, and join order (e.g., predicting that the join order of two tables should be switched at some point in the future). Further, in some embodiments, computing resources (e.g., CPU, memory, storage) can be used in determining when a replacement query access plan should be generated and how long the build will take. Further yet, in some embodiments, multiple significant trends may be used together in order to forecast when a replacement query access plan should be implemented.

Referring now to FIG. 5, shown is an example frequent values list 500 usable for detecting significant trends in statistics, in accordance with embodiments. In some embodiments, certain statistics that are likely to have an impact on query access plans needing to be replaced may be continuously or periodically tracked by a database management system. These may include, for example, statistics that are changing rapidly or statistics that are likely to change more often than others. As shown, frequent value list 500 includes information about four values (A, B, D, and Z) that are located within a table of interest, as well as information about these values that is useful in forecasting when one or more queries related to the table will require new query access plans. Specifically, frequent value list 500 includes seven columns 501-507. Besides the listing of the values in 501, there is, in 502, a current estimate of the number of times that each value appears in the table, and there is, in 503, a current estimate of the rates that the each value is being added (or deleted) from the table. From column 501-503, much information can be gleaned about the values. For example, it is clear from these columns that value B currently appears in the table approximately 2,000 times but it is being removed from the table at an estimated rate of 10 values per minute.

Also included in the frequent value list are columns 504-507. These columns provide more specific information about how trends in the values affect specific query access plans. Specifically, column 504 provides a switch query access plan count for query access plan 1 of query 1 and column 505 provides a switch query access plan target time for the query access plan 1. From these columns, it can be determined, for example, that a new query access plan for query 1 will be needed when value A reaches a count of 1,500, which translates to needing a new query access plan in five minutes. Similarly, column 506 provides a switch query access plan count for query access plan 2 of query 2 and column 507 provides a switch query access plan target time for the query access plan 2. It is noted that frequent values list 500 is provided as merely an example of one embodiment of the present disclosure. There are many ways that statistics may be tracked and maintained. In some embodiments, many other variants on frequent value list 500 are possible. For example, a different table could be used and a different algorithm could be used to calculate the change rate of values A, B, D, and Z.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating a replacement query access plan, the system comprising:

a memory; and at least one processor circuit in communication with the memory, wherein the at least one processor circuit is configured to perform a method comprising:

receiving, by a database management system (DBMS), a query;

generating, by an optimizer of the DBMS and based on statistics for a database, a first query access plan for executing the query on the database;

obtaining, by the DBMS, a first result set for the query by implementing the first query access plan on the database;

forecasting, by the DBMS and based on at least one trend in the statistics, a target time after which implementing the first query access plan will fail a set of criteria, wherein the at least one trend in the statistics is caused by a substantially constant rate of change in at least one item over time, the at least one item selected from the group of items consisting of: frequent value count, singular value count, unique value count, size, and access time;

detecting the substantially constant rate of change in the at least one item over time;

extrapolating, in response to the detecting, to predict statistics at the target time by calculating a result of applying the substantially constant rate of change to a current value of the at least one item between a current time and the target time;

generating, by the optimizer, in response to the forecasting and based on the statistics, a replacement query access plan prior to the target time, wherein the replacement query access plan is generated based on the predicted statistics; and obtaining, by the DBMS, a second result set for the query by implementing, after the target time, the replacement query access plan rather than the first query access plan.

2. The system of claim 1, wherein the method further comprises:

updating the statistics prior to the generating the replacement query access plan.

3. The system of claim 1 wherein the failing the set of criteria comprises a first cost of implementing the first query access plan exceeding a second cost of implementing the replacement query access plan.

4. The system of claim 1, wherein the receiving the query includes receiving a first request to execute the query, wherein the generating the first query access plan occurs in response to the receiving the first request, and wherein the obtaining the first result set occurs before the target time.

5. The system of claim 1, wherein the method further comprises:

receiving, after the target time, a second request to execute the query, wherein the obtaining the second result set occurs in response to the receiving the second request.

6. The system of claim 1, wherein the method further comprises:

estimating, prior to the generating the replacement query access plan, a resource requirement for the generating the replacement query access plan; and determining, based on the resource requirement and the target time, when to begin the generating the replacement query access plan.

7. The system of claim 1, wherein the database includes a first table, wherein the first query access plan includes a first method of accessing the first table, wherein the replacement query access plan includes a second method of accessing the first table rather than the first method, wherein the first access method is of a first type, wherein the second access method is of a second type, wherein the first type and second access type are different, and wherein the first type and second type are both selected from a group of access method types consisting of: index access, table access, hash access, parallel access, and sequential access.

8. A computer program product for generating a replacement query access plan, the computer program product comprising a computer readable storage medium having program instructions embodied therewith, the program instructions executable by a computer to cause the computer to perform a method comprising:

receiving, by a database management system (DBMS), a query;

generating, by an optimizer of the DBMS and based on statistics for a database, a first query access plan for executing the query on the database;

obtaining, by the DBMS, a first result set for the query by implementing the first query access plan on the database;

forecasting, by the DBMS and based on at least one trend in the statistics, a target time after which implementing the first query access plan will fail a set of criteria, wherein the at least one trend in the statistics is caused by a substantially constant rate of change in at least one item over time, the at least one item selected from the group of items consisting of: frequent value count, singular value count, unique value count, size, and access time;

detecting the substantially constant rate of change in the at least one item over time;

extrapolating, in response to the detecting, to predict statistics at the target time by calculating a result of applying the substantially constant rate of change to a current value of the at least one item between a current time and the target time;

generating, by the optimizer, in response to the forecasting and based on the statistics, a replacement query access plan prior to the target time, wherein the replacement query access plan is generated based on the predicted statistics; and obtaining, by the DBMS, a second result set for the query by implementing, after the target time, the replacement query access plan rather than the first query access plan.

9. The computer program product of claim 8, wherein the method further comprises:

updating the statistics prior to the generating the replacement query access plan.

10. The computer program product of claim 8, wherein the failing the set of criteria comprises a first cost of implementing the first query access plan exceeding a second cost of implementing the replacement query access plan.

11. The computer program product of claim 8, wherein the receiving the query includes receiving a first request to execute the query, wherein the generating the first query access plan occurs in response to the receiving the first request, and wherein the obtaining the first result set occurs before the target time.

12. The computer program product of claim 11, wherein the method further comprises:

receiving, after the target time, a second request to execute the query, wherein the obtaining the second result set occurs in response to the receiving the second request.

13. The computer program product of claim 8, wherein the method further comprises:

estimating, prior to the generating the replacement query access plan, a resource requirement for the generating the replacement query access plan; and determining, based on the resource requirement and the target time, when to begin the generating the replacement query access plan.

14. The computer program product of claim 8, wherein the database includes a first table, wherein the first query access plan includes a first method of accessing the first table, wherein the replacement query access plan includes a second method of accessing the first table rather than the first method, wherein the first access method is of a first type, wherein the second access method is of a second type, wherein the first type and second access type are different, and wherein the first type and second type are both selected from a group of access method types consisting of: index access, table access, hash access, parallel access, and sequential access.

* * * * *